(12) United States Patent
Kitazato

(10) Patent No.: US 9,237,374 B2
(45) Date of Patent: Jan. 12, 2016

(54) CONTENT BROADCAST DEVICE, CONTENT BROADCAST METHOD, CONTENT RECEPTION DEVICE, CONTENT RECEPTION METHOD, PROGRAM, AND CONTENT BROADCAST SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 12/890,742

(22) Filed: Sep. 27, 2010

(65) Prior Publication Data

US 2011/0083142 A1   Apr. 7, 2011

(30) Foreign Application Priority Data

Oct. 6, 2009   (JP) ................ P2009-232689

(51) Int. Cl.
*H04N 21/435* (2011.01)
*H04N 21/235* (2011.01)
*H04N 21/2362* (2011.01)
(Continued)

(52) U.S. Cl.
CPC ........... *H04N 21/435* (2013.01); *H04N 21/235* (2013.01); *H04N 21/2353* (2013.01); *H04N 21/2362* (2013.01); *H04N 21/25875* (2013.01); *H04N 21/4331* (2013.01); *H04N 21/4345* (2013.01); *H04N 21/4532* (2013.01);
(Continued)

(58) Field of Classification Search
CPC ............ H04N 21/235; H04N 21/2353; H04N 21/236; H04N 21/23614; H04N 21/40; H04N 21/43; H04N 21/462
USPC ................................ 725/37, 39, 40
See application file for complete search history.

(56) References Cited

U.S. PATENT DOCUMENTS

2002/0104101 A1* 8/2002 Yamato et al. ................ 725/139
2002/0194603 A1* 12/2002 Connelly ........................ 725/46
(Continued)

FOREIGN PATENT DOCUMENTS

EP   1 612 686 A1   1/2006
EP   2134091 A1   12/2009
(Continued)

OTHER PUBLICATIONS

Rauschenbach et al: "Interactive TV: A new application for mobile computing", Computers and Graphics, Elsevier, GB, vol. 30, No. 5, (Oct. 1, 2006) pp. 727-736.
(Continued)

*Primary Examiner* — Kyu Chae
(74) *Attorney, Agent, or Firm* — Paratus Law Group, PLLC

(57) ABSTRACT

A content broadcast device for broadcasting a content, using a broadcast wave, the content broadcast device including a first supply section configured to supply service information to a content reception device through a predetermined network in response to a request from the content reception device, the service information including at least a broadcast schedule of metadata and location information that indicates where the metadata is located in the broadcast wave, and a broadcast section configured to broadcast, using the broadcast wave, the metadata, which includes at least a broadcast schedule of the content and location information that indicates where the content is located in the broadcast wave, in accordance with the broadcast schedule of the metadata, included in the service information, and broadcast, using the broadcast wave, the content in accordance with the broadcast schedule of the content, included in the metadata.

17 Claims, 7 Drawing Sheets

(51) Int. Cl.
*H04N 21/258* (2011.01)
*H04N 21/433* (2011.01)
*H04N 21/434* (2011.01)
*H04N 21/45* (2011.01)
*H04N 21/61* (2011.01)
*H04N 21/6334* (2011.01)
*H04N 21/8405* (2011.01)

(52) U.S. Cl.
CPC ..... *H04N21/6125* (2013.01); *H04N 21/63345* (2013.01); *H04N 21/8405* (2013.01)

(56) References Cited

U.S. PATENT DOCUMENTS

| | | | |
|---|---|---|---|
| 2003/0033606 A1 | 2/2003 | Puente et al. | |
| 2007/0150892 A1 | 6/2007 | Chaney | |
| 2007/0162934 A1* | 7/2007 | Roop et al. | 725/50 |
| 2008/0320536 A1* | 12/2008 | Kim et al. | 725/109 |
| 2009/0208180 A1 | 8/2009 | Ashby et al. | |
| 2010/0046931 A1* | 2/2010 | Takao et al. | 386/124 |
| 2013/0081094 A1* | 3/2013 | Song et al. | 725/115 |

FOREIGN PATENT DOCUMENTS

| | | |
|---|---|---|
| JP | 11-098477 | 4/1999 |
| JP | 2002-521873 | 7/2002 |
| JP | 2005-130085 | 5/2005 |
| JP | 2006-287769 | 10/2006 |
| JP | 2009-027390 | 2/2009 |
| JP | 2009-118360 | 5/2009 |

OTHER PUBLICATIONS

European Search Report of Corresponding European Application No. EP 10 17 9411 mailed Dec. 19, 2011.
Jul. 29, 2014, Japanese Office Action for related JP application No. 2013-174132.
Feb. 5, 2014, European Office Action for related EP application No. 10179411.3.
Lee, et al., Metadata Archiving Function for Personalized DMB System, Advanced Communication Technology, 2009, ICACT 2009, 11$^{th}$ International Conference, Feb. 15, 2009, p. 2179-2184.
May 15, 2014, Japanese Office Action for related JP application No. 2013-174132.

* cited by examiner

CONTENT BROADCAST DEVICE, CONTENT BROADCAST METHOD, CONTENT RECEPTION DEVICE, CONTENT RECEPTION METHOD, PROGRAM, AND CONTENT BROADCAST SYSTEM

BACKGROUND OF THE INVENTION

1. Field of the Invention

The present invention relates to a content broadcast device, a content broadcast method, a content reception device, a content reception method, a program, and a content broadcast system. In particular, the present invention relates to a content broadcast device, a content broadcast method, a content reception device, a content reception method, a program, and a content broadcast system, which utilize a broadcast wave and realize a content download service for a specific user.

2. Description of the Related Art

The digitalization of television broadcast waves has allowed the more effective use of the bandwidths of the television broadcast waves. Therefore, not only have television programs been broadcasted using television broadcast waves but also various kinds of data have been able to be broadcasted simultaneously with television programs. Using this technique, for example, the transmission of data broadcasting and the transmission of updated data for a control program used for a television receiver or the like are performed.

In addition, for example, there has been proposed a content download service using a broadcast wave, in which a content different from a television program is broadcasted in accordance with a predetermined broadcast schedule and received and accumulated (downloaded) by a reception device, and the downloaded content can be utilized (reproduced) at an arbitrary time (for example, refer to Japanese Unexamined Patent Application Publication No. 2006-287769).

According to the content download service using a television broadcast wave, a user of a reception device that complies with the content download service can view a downloaded content at an arbitrary time.

SUMMARY OF THE INVENTION

It can be supposed that a content download service using a television broadcast wave is used not only in an operation in which contents such as movies or pieces of music are downloaded for general users but also in an operation in which a specific-user-oriented content is downloaded for a specific user.

In this regard, however, in the operation in which the specific-user-oriented content is downloaded for the specific user, it is desirable to keep it confidential from users other than the specific user that the specific-user-oriented content is broadcasted using a television broadcast wave, or the like.

However, in a content download service using a television broadcast wave, which has been proposed in the past, it is difficult to keep it confidential from users other than the specific user that the specific-user-oriented content is broadcasted using a television broadcast wave, or the like.

Taking the circumstances into consideration, the present invention makes it possible to keep it confidential from a third person that a specific-user-oriented content is broadcasted in a content download service using a television broadcast wave.

According to an embodiment of the present invention, there is provided a content broadcast device for broadcasting a content, using a broadcast wave, the content broadcast device including first supply means for supplying service information to a content reception device through a predetermined network in response to a request from the content reception device, the service information including at least a broadcast schedule of metadata and location information that indicates where the metadata is located in the broadcast wave; and broadcast means for broadcasting, using the broadcast wave, the metadata, which includes at least a broadcast schedule of the content and location information that indicates where the content is located in the broadcast wave, in accordance with the broadcast schedule of the metadata, included in the service information, and broadcasting, using the broadcast wave, the content in accordance with the broadcast schedule of the content, included in the metadata.

The supply means can supply the service information to the content reception device through a predetermined network in response to a request from the content reception device operated by a user who has completed usage registration for a content download service.

The metadata broadcasted is encrypted, and a decode key used for decoding the metadata encrypted can be included in the service information.

The content broadcasted is encrypted, and the content broadcast device can further include second supply means for supplying a content key, used for reproducing the content encrypted, to the content reception device through the predetermined network.

According to an embodiment of the present invention, there is provided a content broadcast method performed in a content broadcast device for broadcasting a content, using a broadcast wave, the content broadcast method including the steps of supplying service information to a content reception device through a predetermined network in response to a request from the content reception device, the service information including at least a broadcast schedule of metadata and location information that indicates where the metadata is located in the broadcast wave; broadcasting, using the broadcast wave, the metadata, which includes at least a broadcast schedule of the content and location information that indicates where the content is located in the broadcast wave, in accordance with the broadcast schedule of the metadata, included in the service information; and broadcasting, using the broadcast wave, the content in accordance with the broadcast schedule of the content, included in the metadata.

According to an embodiment of the present invention, there is provided a computer-readable storage medium storing a control program that causes a computer in a content broadcast device to perform a processing operation, wherein the content broadcast device broadcasts a content, using a broadcast wave, the processing operation including the steps of supplying service information to a content reception device through a predetermined network in response to a request from the content reception device, the service information including at least a broadcast schedule of metadata and location information that indicates where the metadata is located in the broadcast wave; broadcasting, using the broadcast wave, the metadata, which includes at least a broadcast schedule of the content and location information that indicates where the content is located in the broadcast wave, in accordance with the broadcast schedule of the metadata, included in the service information; and broadcasting, using the broadcast wave, the content in accordance with the broadcast schedule of the content, included in the metadata.

In the content broadcast device, the content broadcast method, and the control program for the content broadcast device, service information is supplied to a content reception device through a predetermined network in response to a request from the content reception device, the service information including at least a broadcast schedule of metadata and location information that indicates where the metadata is located in the broadcast wave; using the broadcast wave, the metadata, which includes at least the broadcast schedule of a content and location information that indicates where the content is located in the broadcast wave, is broadcasted in accordance with the broadcast schedule of the metadata, included in the service information; and using the broadcast wave, the content is broadcasted in accordance with the broadcast schedule of the content, included in the metadata. Therefore, a specific-user-oriented content can be broadcasted with being kept confidential from users other than a specific user.

According to an embodiment of the present invention, there is provided a content reception device for receiving a content, broadcasted using a broadcast wave, the content reception device including acquisition means for acquiring service information, supplied from a content broadcast device, through a predetermined network, the service information including at least a broadcast schedule of metadata and location information that indicates where the metadata is located in the broadcast wave; reception means for receiving the metadata, broadcasted using the broadcast wave, on the basis of the service information acquired, the metadata including at least a broadcast schedule of the content and location information that indicates where the content is located in the broadcast wave, and receiving the content, broadcasted using the broadcast wave, in accordance with a download reservation generated on the basis of the metadata received; accumulation means for accumulating the content received; and reproduction means for reproducing the content accumulated.

The acquisition means can notify the content broadcast device of registration information input by a user who has completed usage registration for a content download service, and acquire the service information, supplied from the content broadcast device in accordance with the registration information, through a predetermined network.

The reception means can acquire the received metadata when a service code included in the service information acquired matches a service code in the received metadata.

The reception means can decode the metadata, using a decode key included in the service information, when the received metadata is encrypted.

The content reception device can further include generation means for presenting a list of downloadable contents to a user on the basis of the metadata acquired and generating the download reservation in response to a selection operation performed by the user.

The generation means can generate the download reservation on the basis of the acquired metadata when a broadcasted content corresponds to an automatic download type.

According to an embodiment of the present invention, there is provided a content reception method performed in a content reception device for receiving a content, broadcasted using a broadcast wave, the content reception method including the steps of acquiring service information, supplied from a content broadcast device, through a predetermined network, the service information including at least a broadcast schedule of metadata and location information that indicates where the metadata is located in the broadcast wave; receiving the metadata, broadcasted using the broadcast wave, on the basis of the service information acquired, the metadata including at least a broadcast schedule of the content and location information that indicates where the content is located in the broadcast wave; receiving the content, broadcasted using the broadcast wave, in accordance with a download reservation generated on the basis of the metadata received; accumulating the content received; and reproducing the content accumulated.

According to an embodiment of the present invention, there is provided a computer-readable storage medium storing a control program that causes a computer in a content reception device to perform a processing operation, wherein the content reception device receives a content, broadcasted using a broadcast wave, the processing operation including the steps of acquiring service information, supplied from a content broadcast device, through a predetermined network, the service information including at least a broadcast schedule of metadata and location information that indicates where the metadata is located in the broadcast wave; receiving the metadata, broadcasted using the broadcast wave, on the basis of the service information acquired, the metadata including at least a broadcast schedule of the content and location information that indicates where the content is located in the broadcast wave; receiving the content, broadcasted using the broadcast wave, in accordance with a download reservation generated on the basis of the metadata received; accumulating the content received; and reproducing the content accumulated.

In the content reception device, the content reception method, and the control program for the content reception device, service information, supplied from a content broadcast device, is acquired through a predetermined network, the service information including at least a broadcast schedule of metadata and location information that indicates where the metadata is located in the broadcast wave; the metadata, broadcasted using the broadcast wave, is received on the basis of the service information acquired, the metadata including at least a broadcast schedule of the content and location information that indicates where the content is located in the broadcast wave; the content, broadcasted using the broadcast wave, is received in accordance with a download reservation generated on the basis of the metadata received; the content received is accumulated; and the content accumulated is reproduced. Therefore, when a user belongs to a specific user, the user can receive a specific-user-oriented content.

According to an embodiment of the present invention, there is provided a content broadcast system including a content broadcast device configured to broadcast a content, using a broadcast wave, and a content reception device configured to receive the content broadcasted, wherein the content broadcast device includes supply means for supplying service information to the content reception device through a predetermined network in response to a request from the content reception device, the service information including at least a broadcast schedule of metadata and location information that indicates where the metadata is located in the broadcast wave, and broadcast means for broadcasting, using the broadcast wave, the metadata, which includes at least a broadcast schedule of the content and location information that indicates where the content is located in the broadcast wave, in accordance with the broadcast schedule of the metadata, included in the service information, and broadcasting, using the broadcast wave, the content in accordance with the broadcast schedule of the content, included in the metadata; and wherein the content reception device includes acquisition means for acquiring the service information, supplied from the content broadcast device, through the predetermined network, reception means for receiving the metadata, broadcasted using the broadcast wave, on the basis of the service information acquired and receiving the content, broadcasted using the broadcast wave, in accordance with a download reservation generated on the basis of the metadata received, accumulation means for accumulating the content received, and reproduction means for reproducing the content accumulated.

In the content broadcast system, the content broadcast device supplies service information to a content reception device through a predetermined network in response to a request from the content reception device, the service information including at least a broadcast schedule of metadata and location information that indicates where the metadata is located in the broadcast wave, the content broadcast device broadcasts, using the broadcast wave, the metadata, which includes at least a broadcast schedule of the content and location information that indicates where the content is located in the broadcast wave, in accordance with the broadcast schedule of the metadata, included in the service information, and the content broadcast device broadcasts, using the broadcast wave, the content in accordance with the broadcast schedule of the content, included in the metadata. In addition, the content reception device acquires the service information, supplied from the content broadcast device, through the predetermined network, the service information including at least the broadcast schedule of the metadata and the location information that indicates where the metadata is located in the broadcast wave, the content reception device receives the metadata, broadcasted using the broadcast wave, on the basis of the service information acquired, the metadata including at least the broadcast schedule of the content and the location information that indicates where the content is located in the broadcast wave, and the content reception device receives the content, broadcasted using the broadcast wave, in accordance with a download reservation generated on the basis of the metadata received, the content reception device accumulates the content received, and the content reception device reproduces the content accumulated. Therefore, it possible to keep it confidential from users other than a specific user that a specific-user-oriented content is broadcasted in a content download service using a television broadcast wave.

DESCRIPTION OF THE PREFERRED EMBODIMENTS

Hereinafter, preferred embodiments of the present invention will be described in detail with reference to figures.
<1. Embodiment>
[Summary of Specific User-Oriented Content Broadcast System According to Embodiment of Present Invention]

Figure 1:
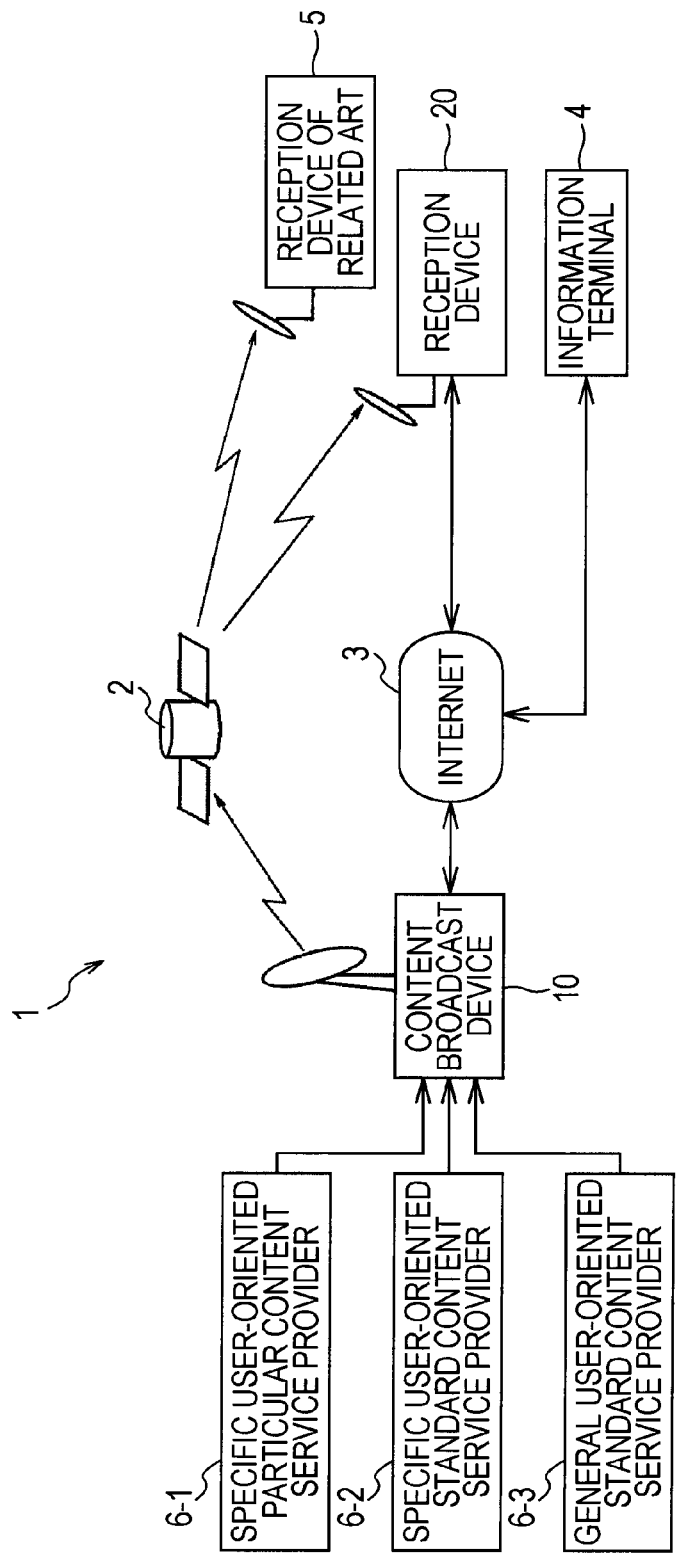
FIG. 1 is a block diagram illustrating a configuration example of a specific user-oriented content broadcast system according to an embodiment of the present invention.

FIG. 1 is a block diagram illustrating a configuration example of a specific user-oriented content broadcast system according to an embodiment of the present invention.

In a specific user-oriented content broadcast system 1, in addition to an operation in which contents such as movies or pieces of music are downloaded for general users, a specific-user-oriented content is downloaded for a specific user.

Specifically, examples of the operation in which the specific-user-oriented content is downloaded for the specific user include the distribution of a content for a person belonging to a specific business field, the distribution of a content as a dogma for a believer belonging to a specific religious group, the distribution of a content as educational material for a student who is studying at a specific educational institution, the distribution of an audio content reproducible in a specific audio device, the distribution of a game program available for a specific game device, the distribution of dedicated EPG data for a specific home electric device, the distribution of updated data for a control program executed in a specific home electric device, and the distribution of an OS and an application program for a personal computer or updated data therefor.

The specific user-oriented content broadcast system 1 includes a content broadcast device 10 arranged in a broadcast station or the like and a reception device 20 arranged in a user's home or the like.

A specific user-oriented particular content service provider 6-1, a specific user-oriented standard content service provider 6-2, and a general user-oriented standard content service provider 6-3 supply individual particular contents or individual standard contents and metadata thereof to the content broadcast device 10. When it is not necessary to distinguish between the specific user-oriented particular content service provider 6-1, the specific user-oriented standard content service provider 6-2, and the general user-oriented standard content service provider 6-3, these service providers are simply referred to as "service provider 6", hereinafter.

Here, it may be assumed that a standard content corresponds to a content having a widely prevalent data format (encoding method or the like), for example, MPEG2, H.264 or the like in the case of a video content, or AAC, MP3 or the like in the case of an audio content. On the other hand, it may be assumed that a particular content corresponds to a content having an unfamiliar data format.

Using a television broadcast wave, the content broadcast device 10 broadcasts metadata, which relates to a content to be broadcasted in the future, in accordance with a predetermined broadcast schedule. In addition, using a television broadcast wave, the content broadcast device 10 broadcasts a content in accordance with a predetermined broadcast schedule. In addition, examples of the television broadcast wave that the content broadcast device 10 uses in order to broadcast the metadata and the content may include a terrestrial broadcast wave and a television broadcast wave transmitted through a communication cable such as a cable TV network or the like, in addition to the television broadcast wave transmitted through a satellite 2 as shown in FIG. 1.

The reception device 20 receives the television broadcast wave broadcasted from the content broadcast device 10 and acquires and holds metadata multiplexed in the television broadcast wave. In addition, in accordance with the held metadata, the reception device 20 acquires and stores (downloads) a particular content and a standard content, multiplexed in the television broadcast wave.

Furthermore, the reception device 20 outputs various kinds of screens, functioning as user interfaces, to a television receiver (not shown in FIG. 1), functioning as a monitor, or the like. In addition, the reception device 20 reproduces the downloaded particular or standard content at an arbitrary time in accordance with an operation performed by a user, and outputs a video signal and an audio signal, obtained as the reproduction result, to the television receiver or the like.

In this regard, however, in order for the reception device 20 to download a particular content and a standard content from the specific user-oriented particular content service provider 6-1 and the specific user-oriented standard content service provider 6-2, respectively, it is necessary for the user to perform usage registration by operating an information terminal 4 and accessing a predetermined server through Internet 3.

Here, the information terminal 4 is a personal computer or the like that can access the predetermined server through the Internet 3. A function equivalent to the function of the information terminal 4 may be embedded in the reception device 20.

In addition, in order for the reception device 20 to download a standard content from the general user-oriented standard content service provider 6-3, the user may also perform usage registration by operating the information terminal 4.

In addition, the reception device 20 may be embedded in the television receiver or the like.

While the reception device 20 can download the particular content and the standard content, a reception device 5 of the related art can download a standard content from the general user-oriented standard content service provider 6-2.

Namely, the content broadcast device 10 broadcasts metadata in such a setting that it is difficult for the reception device 5 of the related art to acquire metadata corresponding to a particular content broadcasted from the specific user-oriented particular content service provider 6-1 and metadata corresponding to a standard content broadcasted from the specific user-oriented standard content service provider 6-2 (described in detail, hereinafter).

Accordingly, it is difficult for the reception device 5 of the related art to indicate to the user that the particular content is broadcasted from the specific user-oriented particular content service provider 6-1 and the standard content is broadcasted from the specific user-oriented standard content service provider 6-2, and to download these contents.

[Detailed Configuration Example of Specific User-Oriented Content Broadcast System]

Figure 2:
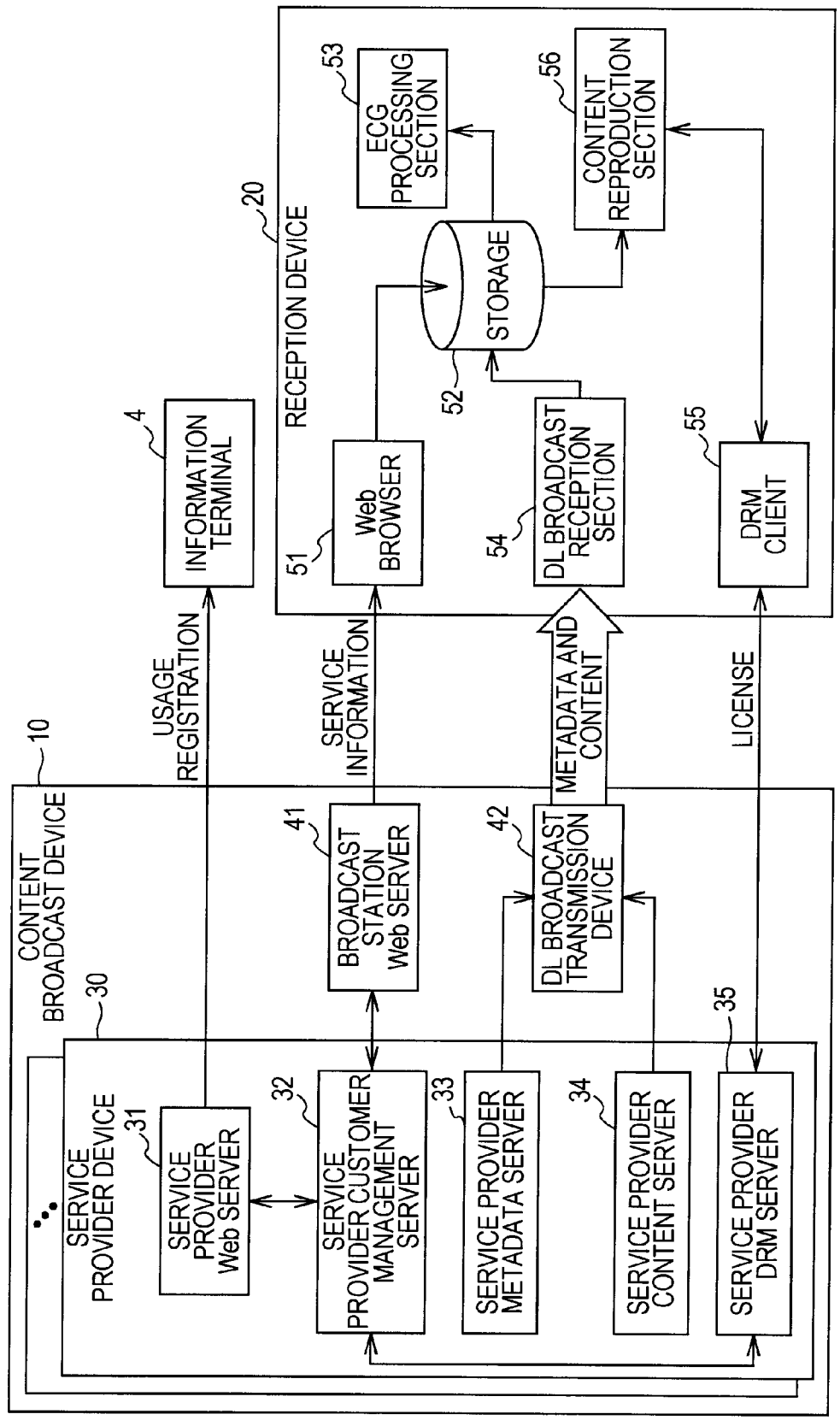
FIG. 2 is a block diagram illustrating detailed configuration examples of a content broadcast device and a reception device, shown in FIG. 1.

FIG. 2 is a block diagram illustrating detailed configuration examples of the content broadcast device 10 and the reception device 20, included in the specific user-oriented content broadcast system 1.

The content broadcast device 10 includes a plurality of service provider devices 30 corresponding to a plurality of service providers 6, respectively, a broadcast station Web server 41, and a download (DL) broadcast transmission device 42.

Each of the service provider devices 30 includes a service provider Web server 31, a service provider customer management server 32, a service provider metadata server 33, a service provider content server 34, and a service provider DRM server 35.

The service provider Web server 31 is a server that, using the information terminal 4, the user of the reception device 20 accesses through the Internet 3. In response to a request from the information terminal 4, the service provider Web server 31 supplies a hypertext markup language (HTML) document or the like, which is used for displaying a service usage registration page (Web page), to the information terminal 4 through the Internet 3.

In addition, the service provider Web server 31 acquires user information of the user, input to the service usage registration page, from the information terminal 4 through the Internet 3, and supplies the acquired user information to the service provider customer management server 32 and causes the service provider customer management server 32 to register the user information. The user information includes payment information such as a credit card number or the like in addition to personal information such as the address of the user and the user's name or the like.

In addition, the service provider Web server 31 notifies the information terminal 4 of an application number and a password for the user who has performed usage registration, which are issued from the service provider customer management server 32.

In accordance with the user information supplied from the service provider Web server 31, the service provider customer management server 32 issues the application number and the password for the use and notifies the service provider Web server 31 of the application number and the password. Furthermore, the service provider customer management server 32 associates the user information of the user who has performed usage registration with the issued application number and issued password, and registers these pieces of information. Furthermore, using the payment information included in the user information, the service provider customer management server 32 makes payment for the usage of a content download service at a predetermined time.

In addition, the issued application number includes a service code used for uniquely identifying a content download service provided by the service provider 6 and a user ID.

The service provider metadata server 33 holds metadata corresponding to a content supplied from the service provider 6, and encrypts and outputs the held metadata to the DL broadcast transmission device 42 in accordance with a predetermined broadcast schedule. In addition, the metadata may not be encrypted.

In addition, the metadata includes the broadcast schedule information of a corresponding content, or the like (details will be described with reference to FIG. 4, hereinafter). Accordingly, the metadata is broadcasted in advance of the broadcast of the corresponding content, and the corresponding content is received in the reception device 20 in accordance with the metadata.

The service provider content server 34 holds a content (particular content or standard content) supplied from the service provider 6, and encrypts and outputs the held content to the DL broadcast transmission device 42 in accordance with a predetermined broadcast schedule.

In response to a request from a DRM client 55 in the reception device 20, the service provider digital rights management (DRM) server 35 confirms with the service provider customer management server 32 whether or not the user of the reception device 20 is a legitimate user. In addition, when the user of the reception device 20 is a legitimate user, the service provider digital rights management (DRM) server 35 supplies a license, which includes a content key necessary for the reception device 20 to reproduce a downloaded content, to the DRM client 55 by reserving a secure communication channel on the Internet 3.

The broadcast station Web server 41 is a server that a Web browser 51 in the reception device 20 accesses through the Internet 3. In addition, for example, a uniform resource locator (URL) necessary to access the broadcast station Web server 41 may be linked to a predetermined button or the like on the screen of a data broadcast broadcasted using a television broadcast wave.

In response to a request from the Web browser 51, the broadcast station Web server 41 supplies a broadcast markup language (BML) document or the like to the Web browser 51, the broadcast markup language (BML) document or the like being used for displaying a service entry page (Web page) that is a common entry for individual content download services provided by a plurality of service providers 6 different from one another.

Furthermore, in response to the input of the application number and the password, issued at the time of the usage registration, to the service entry page, the broadcast station Web server 41 transmits to the Web browser 51 service information corresponding to a service code included in the application number.

The service information is information preliminarily provided by each service provider, and includes location information indicating where metadata is located in a television broadcast wave and the broadcast schedule of the metadata, or the like. In addition, details of the service information will be described with reference to FIG. 3, hereinafter.

Using a television broadcast wave, the DL broadcast transmission device 42 broadcasts metadata, input from the service provider metadata server 33, in accordance with a predetermined broadcast schedule. In addition, using a television broadcast wave, the DL broadcast transmission device 42 broadcasts a content, input from the service provider content server 34, in accordance with a predetermined broadcast schedule.

The reception device 20 includes the Web browser 51, a storage 52, an ECG processing section 53, a DL broadcast reception section 54, the DRM client 55, and a content reproduction section 56.

The Web browser 51 acquires from a data broadcasting signal in a television broadcast wave a BML document or the like used for displaying a data broadcasting top screen (Web page) of a corresponding broadcast station, and causes a television receiver (not shown in FIG. 2) to display the screen.

In addition, in response to the user's operation of a predetermined button arranged on the screen, the Web browser 51 accesses through the Internet 3 the broadcast station Web server 41 linked to the predetermined button, and, on the basis of a BML document or the like obtained as the access result, displays the service entry page. Furthermore, the Web browser 51 notifies the broadcast station Web server 41 of the application number and the password, input from the service entry page by the user, and causes the storage 52 to hold service information obtained as the notification result.

The storage 52 includes a hard disk drive or the like, and holds the service information, acquired from the broadcast station Web server 41 by the Web browser 51, and metadata and a content, received by the DL broadcast reception section 54.

In response to a predetermined operation performed by the user, the ECG processing section 53 causes a user interface (the list of contents available in a download reservation), which is used by the user in order to select a content to be downloaded, to be displayed on the basis of the metadata held in the storage 52. In addition, in response to a predetermined operation performed by the user, the ECG processing section 53 causes a user interface (the list of downloaded contents), which is used by the user in order to select a content to be reproduced from among the downloaded contents, to be displayed on the basis of the contents accumulated in the storage 52.

In accordance with the broadcast schedule information of the metadata, included in the service information held in the storage 52, the DL broadcast reception section 54 receives metadata (metadata for a content to be broadcasted as a download-use content) from a television broadcast wave and causes the storage 52 to hold the metadata.

In addition, in accordance with the broadcast schedule information of a content, included in metadata that is included in the metadata held in the storage 52 and subjected to a download reservation, the DL broadcast reception section 54 receives the content from a television broadcast wave and causes the storage 52 to hold the content.

After establishing a secure communication channel on the Internet 3 between the DRM client 55 and the service provider DRM server 35 in the content broadcast device 10, the DRM client 55 acquires and holds for itself a license including a content key necessary to decode a downloaded content. In addition, in response to a request from the content reproduction section 56, the DRM client 55 supplies the content key to the content reproduction section 56 when a usage condition described in the license is met.

The content reproduction section 56 is activated by the ECG processing section 53, reads out from the storage 52 a content selected so as to be reproduced, and decodes and reproduces an encrypted content, using the content key supplied from the DRM client 55. In addition, the content reproduction section 56 outputs a video signal and an audio signal, obtained as a result, to the television receiver or the like.

[Data Structure of Service Information]

Figure 3:
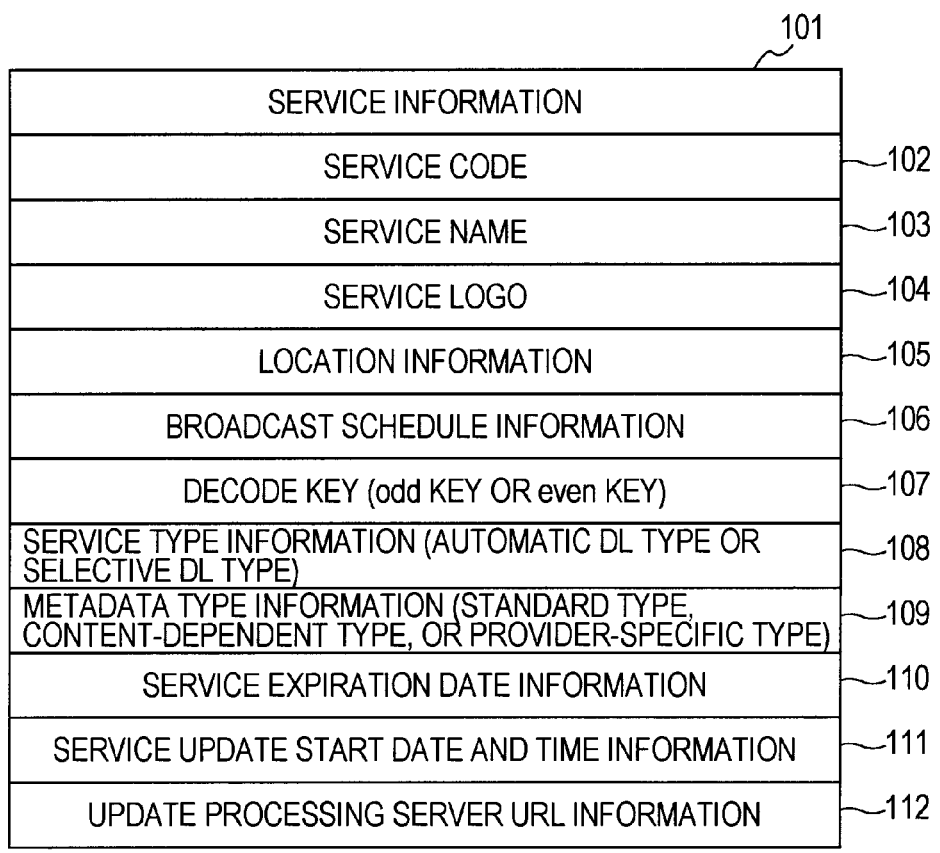
FIG. 3 is a diagram illustrating a data structure of service information.

FIG. 3 is a diagram illustrating the data structure of the service information that the Web browser 51 in the reception device 20 acquires from the broadcast station Web server 41 in the content broadcast device 10 through the Internet 3.

Service information 101 includes a service code 102, a service name 103, a service logo 104, location information 105, broadcast schedule information 106, and a decode key 107. Furthermore, the service information 101 includes service type information 108, metadata type information 109, service expiration date information 110, service update start date and time information 111, and update processing server URL information 112.

The service code 102 is information used for uniquely identifying a content download service provided by a corresponding service provider 6. The service name 103 is a name used for the content download service provided by the service provider 6. The service logo 104 is image data used for displaying logos (marks) of content download services provided by individual service providers 6.

The location information 105 is information used for indicating the position of metadata on the broadcast stream of a television broadcast wave by using an IP address, a port number, and a session identification number (TSI). The broadcast schedule information 106 is information used for indicating the start time and the time length of a broadcast in which metadata is broadcasted using a television broadcast wave.

The decode key 107 corresponds to two kinds of decode keys (odd key and even key) used for decoding the encryption of the metadata when the metadata is encrypted. In this regard, however, one of the odd key and the even key is used for decoding the encrypted metadata, and the other key is a next (update-use) decode key used for decoding in the case in which an encryption key used for encrypting metadata is updated.

The service type information 108 is information used for indicating whether a content of a corresponding content download service is an automatic DL type, in which a content is automatically downloaded without a user's selection operation, or a selective DL type, in which a content subjected to the user's selection operation (reservation operation) is downloaded.

The metadata type information 109 indicates whether the data structure of the metadata is a standard type, a content-dependent type, or a provider-specific type.

The service expiration date information 110 is information used for indicating a term during which the user of the reception device 20, who has performed usage registration, can use a corresponding content download service. The service update start date and time information 111 is information used for indicating a date and a time when a processing operation for encouraging the user to extend a service expiration date is started. The update processing server URL information 112 is the URL of an update processing server (not shown in figures) that is accessed when the service expiration date is extend.

[Data Structure of Metadata]

Figure 4:
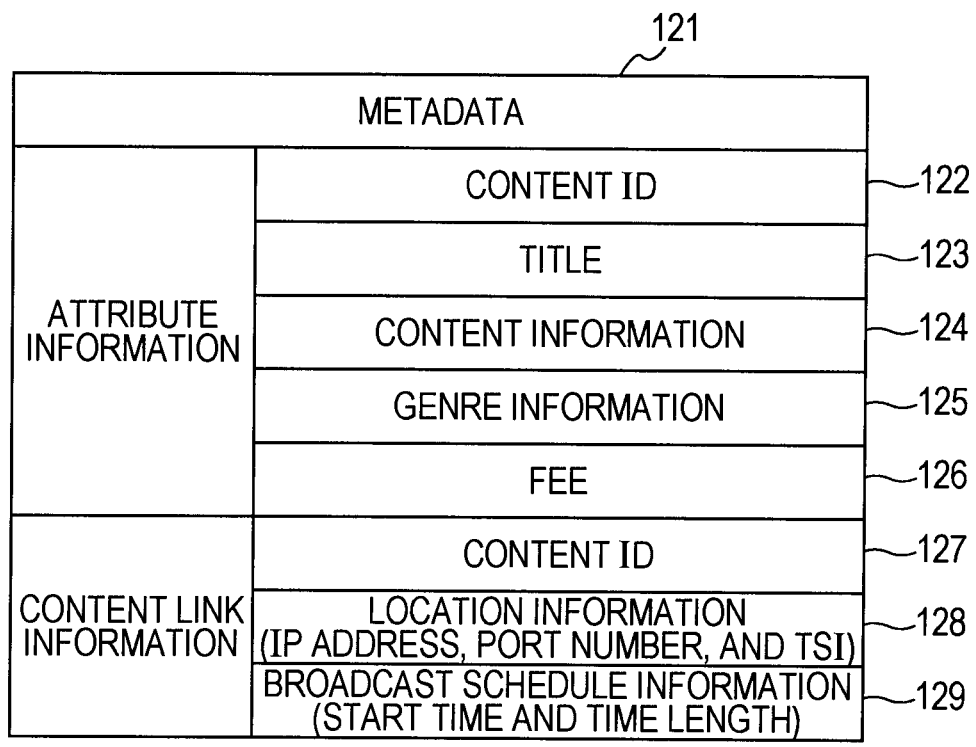
FIG. 4 is a diagram illustrating a data structure of metadata.

FIG. 4 is a diagram illustrating the data structure of metadata that the DL broadcast reception section 54 in the reception device 20 acquires from a television broadcast wave.

As attribute information to be displayed and presented to the user, metadata 121 includes a content ID 122, a title 123, content information 124, genre information 125, and a fee 126. Furthermore, as content link information used for downloading a content, the metadata 121 includes a content ID 127, location information 128, and broadcast schedule information 129.

The content ID 122 as the attribute information is information used for uniquely identifying a content corresponding to metadata. The title 123 is the name of a corresponding content. The content information 124 is information used for describing the content of a corresponding content. The genre information 125 is information used for indicating a genre to which a corresponding content belongs. The fee 126 is information used for indicating the usage fee of a corresponding content.

The content ID 127 as the content link information is identical to the content ID 122 as the attribute information. The location information 128 is information used for indicating the position of a corresponding content on the broadcast stream of a television broadcast wave with using an IP address, a port number, and a session identification number (TSI). The broadcast schedule information 129 is information used for indicating the start time and the time length of a broadcast in which a corresponding content is broadcasted using a television broadcast wave.

[Layer Structure of Broadcast Stream in which Metadata and Content are Broadcasted]

Figure 5:
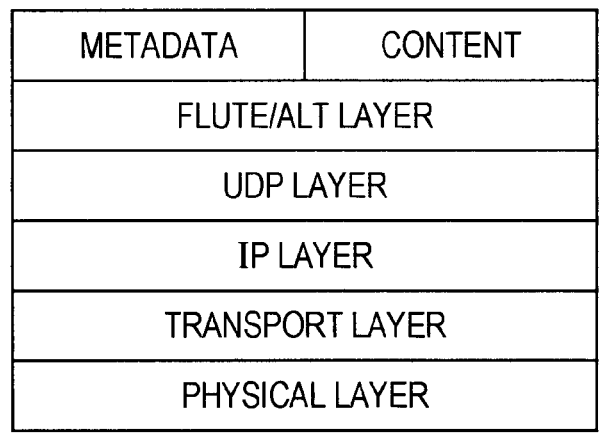
FIG. 5 is a diagram illustrating a layer structure of a broadcast stream in which metadata and a content are broadcasted.

FIG. 5 is a diagram illustrating the layer structure of a broadcast stream in which metadata and a content are broadcasted.

As shown in FIG. 5, in the broadcast stream of a television broadcast wave, a physical layer, a transport layer, an IP layer, a UDP layer, and a FLUTE/ALT layer are arranged in ascending order from the lowest layer. In addition, the metadata and the content are individually stored in sessions in the FLUTE layer and broadcasted.

Figure 6A:
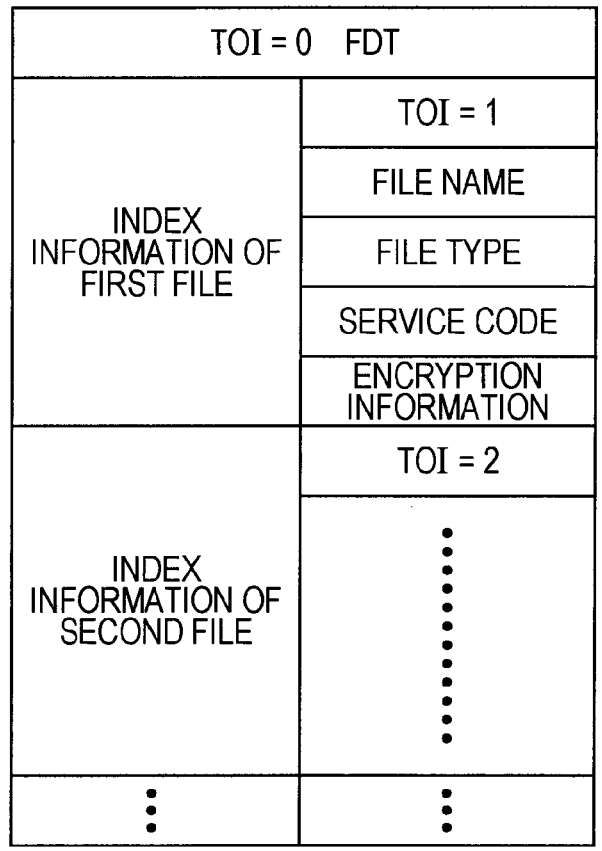
FIGS. 6A and 6B are diagrams illustrating data structures of FDT.

In order to acquire the metadata, the DL broadcast reception section 54 receives a session in the FLUTE layer, which corresponds to the location information 105 in the service information 101, and acquires a FDT corresponding to "TOI=0", in which index information is stored as shown in FIG. 6A.

Pieces of index information individually corresponding to files transmitted in the same session are stored in the FDT. When the first file in the files transmitted in the same session is a file used for metadata, the TOI (TOI=1), the file name, and the file type of a FDT in which the metadata file is stored are described in the index information of the first file. Furthermore, a service code and encryption information are described in the index information.

While, in accordance with the TOI (TOI=1), the file name, and the file type of a metadata file, metadata can be acquired in the DL broadcast reception section 54, a corresponding metadata file can be acquired when the service code in the index information matches the service code 102 in the service information 101.

In other words, when the service code stored in the FDT along with the metadata does not match the service code 102 in the service information 101, the DL broadcast reception section 54 does not acquire the metadata file. Accordingly, the DL broadcast reception section 54 does not acquire the metadata of a content download service in which usage registration has not been performed.

In addition, when encryption information is included in the index information, it is indicated that a corresponding metadata is encrypted. In addition, the encryption information indicates whether a decode key used for decoding the encrypted metadata is the odd key or the even key. Accordingly, in the DL broadcast reception section 54, one of the odd key and the even key included in the decode key 107 in the service information 101 is specified in accordance with the encryption information, and hence the encrypted metadata can be decoded.

As mentioned above, the DL broadcast reception section 54 does not acquire the metadata of a content download service in which usage registration has not been performed. Furthermore, even though the metadata turns out to be acquired owing to some factors, the metadata can remain to be encrypted. Accordingly, the reception device 20 for a specific user can acquire the metadata, and hence it can be kept confidential from users other than the specific user that a specific-user-oriented content is broadcasted, or the like.

[Sequence of Operations Performed in Specific User-Oriented Content Broadcast System 1]

Figure 7:
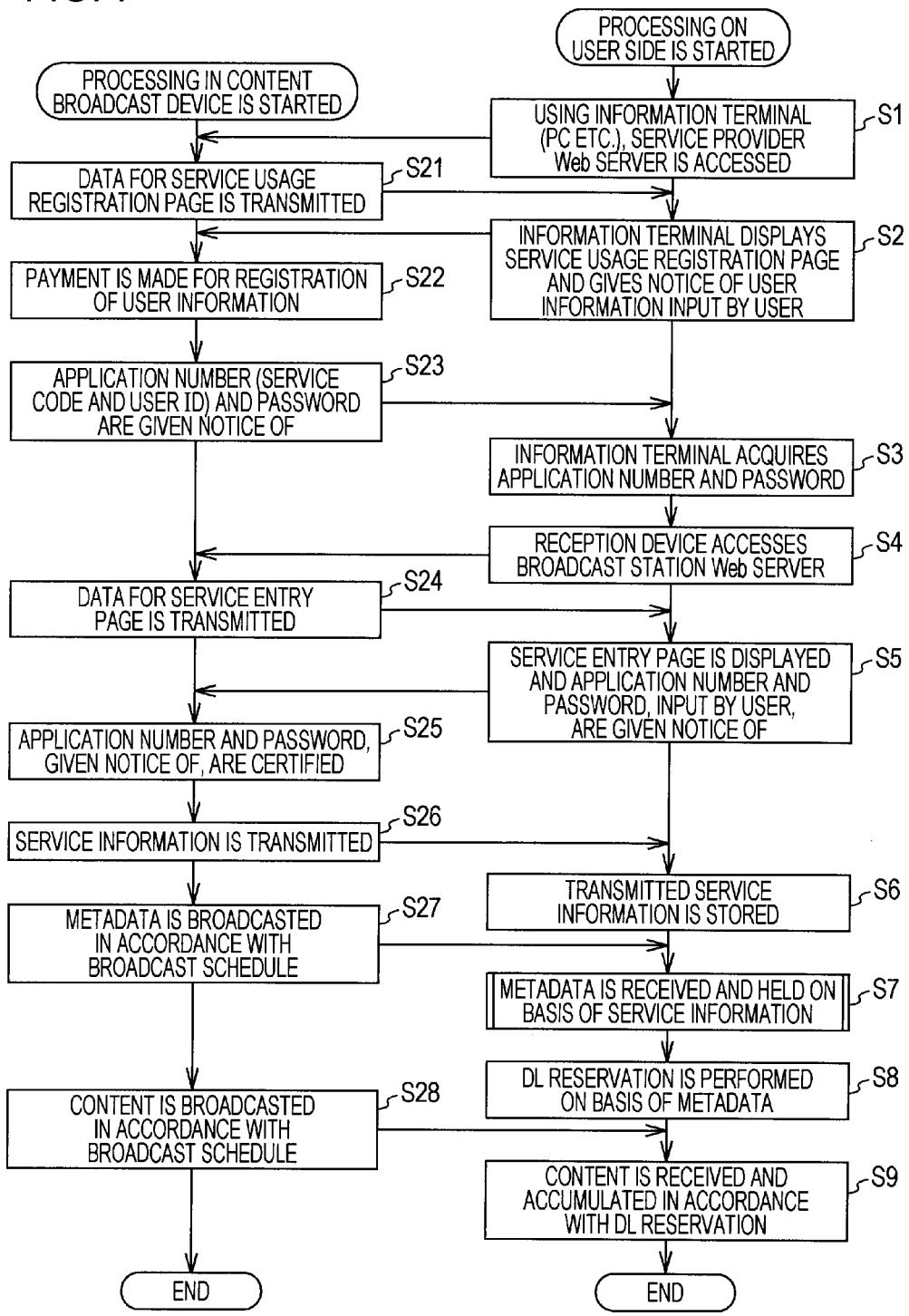
FIG. 7 is a flowchart illustrating an operation performed in a specific user-oriented content broadcast system.

FIG. 7 is a flowchart illustrating a sequence of operations performed in the specific user-oriented content broadcast system 1.

In Step S1, using the information terminal 4, the user of the reception device 20 accesses the service provider Web server 31 through the Internet 3, the service provider Web server 31 being operated by a service provider providing a content download service that the user wishes to utilize. In addition, it is assumed that the user preliminarily acquires a URL from a specific group or the like to which the user belongs, the URL being necessary to access the service provider Web server 31.

In response to an access from the information terminal 4, in Step S21, the service provider Web server 31 transmits HTML data for a service usage registration page (Web page), or the like, to the information terminal 4 through the Internet 3.

In Step S2, the information terminal 4 that receives the HTML data or the like displays the service usage registration page. The user inputs the user information of the user to the service usage registration page, and hence the information terminal 4 notifies the service provider Web server 31 of the input user information through the Internet 3.

In Step S22, the service provider Web server 31 that has acquired the user information of which the information terminal 4 gives notice supplies the user information given notice of to the service provider customer management server 32. In response to the user information supplied from the service provider Web server 31, the service provider customer management server 32 issues an application number and a password for the user and notifies the service provider Web server 31 of the application number and the password. Furthermore, the service provider customer management server 32 associates the user information of the user with the issued application number and issued password, and registers these pieces of information. Furthermore, using the payment information included in the user information, the service provider customer management server 32 makes payment for the usage of the content download service.

In Step S23, through the Internet 3, the service provider Web server 31 notifies the information terminal 4 of the application number and the password for the user who has performed usage registration, which have been issued from the service provider customer management server 32.

In response to the notification, in Step S3, the information terminal 4 acquires the application number and the password given notice of. The user, who acquires the application number and the password, prepares for the following processing operation with writing notes of the application number and the password, or the like, and activates the Web browser 51 in the reception device 20.

In Step S4, the Web browser 51 accesses the broadcast station Web server 41 in accordance with the user's operation.

In response to the access from the Web browser 51, in Step S24, the broadcast station Web server 41 transmits a BML data or the like to the Web browser 51 through the Internet 3, the BML data or the like being used for a service entry page (Web page) that is a common entry for individual content download services provided by a plurality of service providers 6 different from one another.

In Step S5, the Web browser 51 that receives the BML data or the like causes the service entry page to be displayed on the screen of a television receiver or the like. The user inputs the application number and the password, acquired in the processing operation performed in Step S3, to the service usage registration page, and the Web browser 51 notifies the broadcast station Web server 41 of the input application number and the input password through the Internet 3.

In response to the notification of the application number and the password, in Step S25, the broadcast station Web server 41 specifies the service provider 6 indicated by a service code included in the application number given notice of. Furthermore, the broadcast station Web server 41 notifies the service provider customer management server 32, placed in the service provider device 30 that corresponds to the specified service provider 6, of the application number and the password supplied from the Web browser 51, and causes the service provider customer management server 32 to certify whether or not the application number and the password are subjected to usage registration and legitimate. In addition, when the application number and the password are subjected to usage registration and legitimate, the broadcast station Web server 41 transmits the service information 101 to the Web browser 51 through the Internet 3, the service information 101 corresponding to the service provider 6 indicated by the service code included in the application number given notice of.

After that, in Step S27, in accordance with a predetermined broadcast schedule, the DL broadcast transmission device 42 in the content broadcast device 10 broadcasts the metadata 121, input from the service provider metadata server 33, using a television broadcast wave. In addition, in Step S28, in accordance with a predetermined broadcast schedule, the DL broadcast transmission device 42 broadcasts a content, input from the service provider content server 34, using a television broadcast wave.

On the other hand, in Step S6, the Web browser 51 in the reception device 20 receives the service information 101 supplied from the broadcast station Web server 41, and causes the storage 52 to store the service information 101.

In Step S7, on the basis of the service information 101 stored in the storage 52, the DL broadcast reception section 54 receives the metadata 121 from the television broadcast wave and causes the storage 52 to hold the metadata 121.

Figure 8:
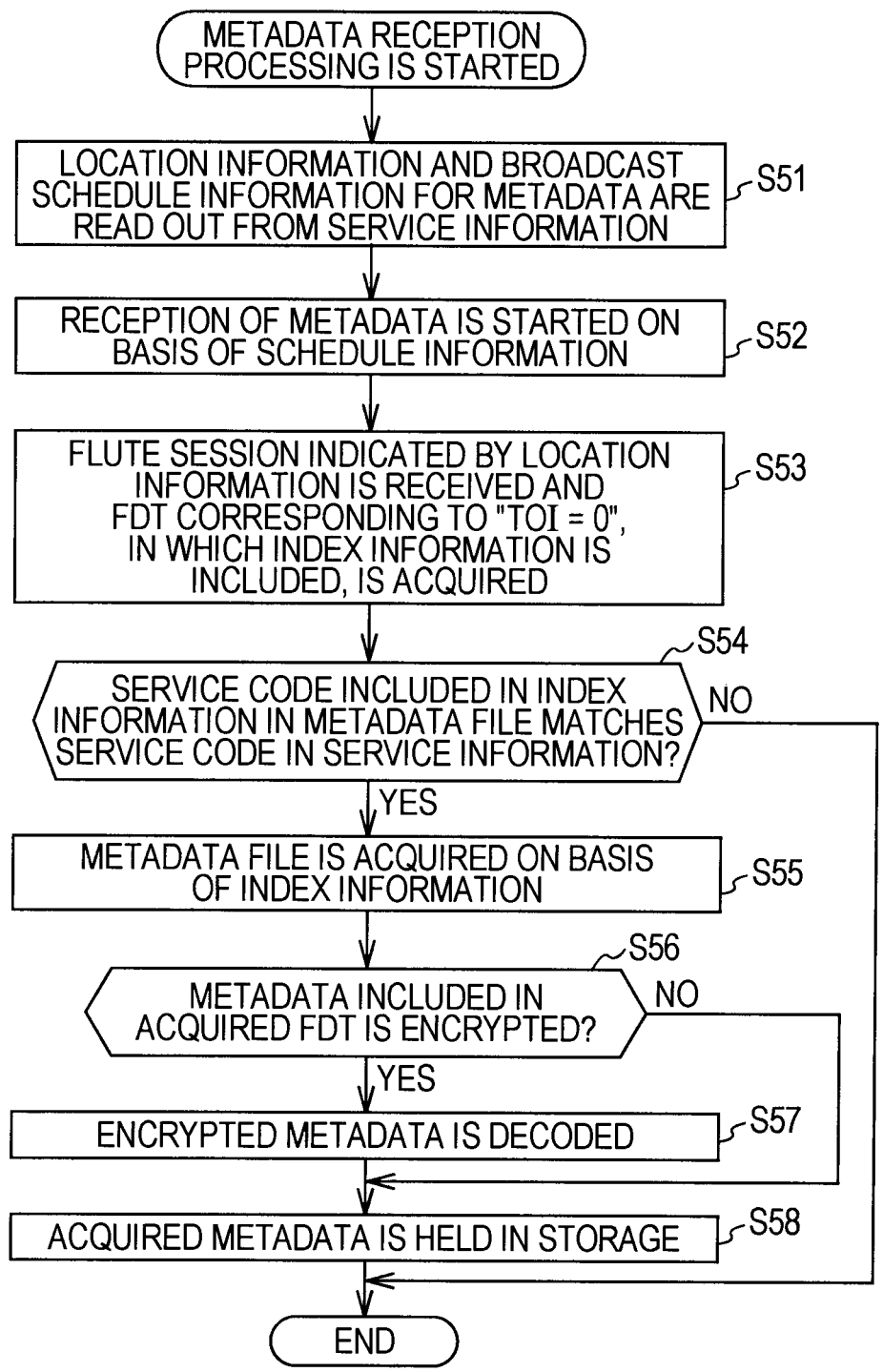
FIG. 8 is a flowchart illustrating a metadata reception processing operation in detail.

FIG. 8 is a flowchart illustrating in detail a processing operation performed in Step S7 (referred to as metadata reception processing operation, hereinafter).

In Step S51, the DL broadcast reception section 54 reads out the service information 101 from the storage 52. Furthermore, the DL broadcast reception section 54 reads out the location information 105 and the broadcast schedule information 106 from the service information 101.

In Step S52, on the basis of the schedule information 106 read out in Step S51, the DL broadcast reception section 54 starts receiving metadata in line with a time when the broadcast of the metadata is started. In Step S53, the DL broadcast reception section 54 receives a session in the FLUTE layer, indicated by the location information 105, from the broadcast stream of the television broadcast wave, and acquires a FDT corresponding to "TOI=0", in which the index information is stored.

In Step S54, on the basis of the index information acquired in Step S53, the DL broadcast reception section 54 determines whether or not a service code in a metadata file matches the service code 102 in the service information 101. In addition, when the two service codes match each other, the DL broadcast reception section 54 advances the processing operation to Step S55. Here, when the two service codes do not match each other, the FDT is abandoned and the metadata reception processing operation is terminated.

Figure 6B:
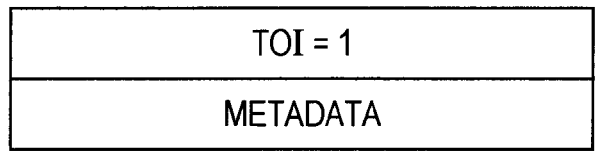

In Step S55, on the basis of the index information acquired in Step S53, the DL broadcast reception section 54 specifies the TOI of a FDT in which the metadata file is stored (in FIG. 6, TOI=1), and acquires the FDT corresponding to the specified TOI. Namely, the DL broadcast reception section 54 acquires the metadata file.

In Step S56, by referring to the encryption information in the index information acquired in Step S53, the DL broadcast reception section 54 determines whether or not the metadata acquired in Step S55 is encrypted. When it is determined that the metadata is encrypted, the processing operation proceeds to Step S57, and the DL broadcast reception section 54 decodes the encrypted metadata, using the decode key 107 in the service information 101. In addition, when, in Step S56, it is not determined that the metadata is encrypted, a processing operation performed in Step S57 is skipped.

In Step S58, the DL broadcast reception section 54 causes the storage 52 to hold the metadata acquired in the processing operation mentioned above. This is the termination of the metadata reception processing operation.

As described above, in the metadata reception processing operation, if the service code in the index information does not match the service code 102 in the service information 101, it is difficult to acquire the metadata corresponding to the index information. In addition, even though a third person can acquire the metadata, the metadata can remain to be encrypted. Accordingly, the reception device 20 for a specific user can acquire the metadata, and it can be kept confidential from the third person that a specific-user-oriented content is broadcasted or the like.

Returning to FIG. 7, in Step S8, in response to a predetermined operation performed by the user, the ECG processing section 53 causes the screen of a user interface, which is used by the user in order to select a content to be downloaded, to be displayed on the television receiver or the like on the basis of the metadata stored in the storage 52. Furthermore, in response to the user's selection operation, the ECG processing section 53 performs the download reservation of the content, and causes the storage 52 to hold the information of the download reservation. In this regard, however, when the content is an automatic DL type, the download reservation of the content is performed regardless of the user's selection operation.

In Step S9, in accordance with the download reservation held in the storage 52 and the broadcast schedule information of the content, which is described in a corresponding metadata, the DL broadcast reception section 54 receives the content from a television broadcast wave, and causes the storage 52 to store the content.

After that, in response to the user's selection operation, performed for the user interface that is used by the user in order to select a content to be reproduced from among downloaded contents to be displayed by the ECG processing section 53, the content stored in the storage 52 is read out from the storage 52 by the content reproduction section 56 and reproduced.

This is the end of the description for the sequence of operations performed in the specific user-oriented content broadcast system 1.

According to the sequence of operations performed in the specific user-oriented content broadcast system 1, described above, the reception device 20 for the user who has performed usage registration can acquire the service information 101. In addition, the reception device 20 can acquire the metadata stored in the FDT along with the service code that matches the service code 102 in the service information 101. Furthermore, the metadata can be encrypted and broadcasted.

Accordingly, the reception device 20 for a specific user can acquire the metadata, and it can be kept confidential from the third person that a specific-user-oriented content is broadcasted or the like.

In addition, in the description mentioned above, the user manually inputs the application number and the password, acquired from the service provider Web server 31 by the information terminal 4, to the service entry page displayed by the Web browser 51 in the reception device 20. However, the application number and the password may be automatically acquired through a wired or wireless connection between the information terminal 4 and the reception device 20 or through a semiconductor memory.

By the way, the sequence of operations mentioned above may be executed using a piece of hardware or software. When the sequence of operations mentioned above is executed using a piece of software, a program included in the software is installed from a program record medium to a computer embedded in a piece of dedicated hardware or a computer, for example, a general-purpose personal computer or the like, in which various kinds of functions can be executed by installing various kinds of programs.

In addition, the program executed by the computer may be a program in which processing operations are executed in a time-series manner in the order described in the specification, and may be a program in which processing operations are executed in parallel or at necessary times such as times when calling operations are performed or the like.

In addition, the program may be a program processed by one computer or a program processed in distributed processing performed by a plurality of computers. Furthermore, the program may be transferred to a remote computer and executed therein.

In addition, in the specification, a system represents an entire device including a plurality of devices.

In addition, embodiments of the present invention are not limited to the embodiments described above, and various modifications may be adopted without departing from the broader spirit and scope of the specification.

The present application contains subject matter related to that disclosed in Japanese Priority Patent Application JP 2009-232689 filed in the Japan Patent Office on Oct. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content broadcast device for broadcasting a content, using a broadcast wave, the content broadcast device comprising:
    first supply means for supplying service information to a content reception device through a predetermined network in response to a request from the content reception device, the service information including at least a broadcast schedule of metadata and location information that indicates where the metadata is located in the broadcast wave; and
    broadcast means for broadcasting, using the broadcast wave, the metadata, which includes at least a broadcast schedule of the content and location information that indicates where the content is located in the broadcast wave, in accordance with the broadcast schedule of the metadata, included in the service information, and broadcasting, using the broadcast wave, the content in accordance with the broadcast schedule of the content, included in the metadata,
    wherein the content reception device does not acquire the broadcasted metadata when the content reception device determines that a service code of the broadcasted metadata dos not match a service code provided within the supplied service information.

2. The content broadcast device according to claim 1, wherein
    the first supply means supplies the service information to the content reception device through a predetermined network in response to a request from the content reception device operated by a user who has completed usage registration for a content download service.

3. The content broadcast device according to any one of claims 1 and 2, wherein
    the metadata broadcasted is encrypted; and
    a decode key used for decoding the metadata encrypted is included in the service information.

4. The content broadcast device according to claim 1, wherein the metadata broadcasted is encrypted, the content broadcast device further comprising:
    second supply means for supplying a content key, used for reproducing the content encrypted, to the content reception device through the predetermined network.

5. A content broadcast method performed in a content broadcast device for broadcasting a content, using a broadcast wave, the content broadcast method comprising the steps of:
    supplying service information to a content reception device through a predetermined network in response to a request from the content reception device, the service information including at least a broadcast schedule of metadata and location information that indicates where the metadata is located in the broadcast wave;

broadcasting, using the broadcast wave, the metadata, which includes at least a broadcast schedule of the content and location information that indicates where the content is located in the broadcast wave, in accordance with the broadcast schedule of the metadata, included in the service information; and broadcasting, using the broadcast wave, the content in accordance with the broadcast schedule of the content, included in the metadata, wherein the content reception device does not acquire the broadcasted metadata when the content reception device determines that a service code of the broadcasted metadata does not match a service code provided within the supplied service information.

6. A non-transitory computer readable storage medium storing a control program, which when executed by a computer, performs a processing operation, the processing operation comprising the steps of:

supplying service information to a content reception device through a predetermined network in response to a request from the content reception device, the service information including at least a broadcast schedule of metadata and location information that indicates where the metadata is located in the broadcast wave;

broadcasting, using the broadcast wave, the metadata, which includes at least a broadcast schedule of the content and location information that indicates where the content is located in the broadcast wave, in accordance with the broadcast schedule of the metadata, included in the service information; and broadcasting, using the broadcast wave, the content in accordance with the broadcast schedule of the content, included in the metadata, wherein the content reception device does not acquire the broadcasted metadata when the content reception device determines that a service code of the broadcasted metadata does not match a service code provided within the supplied service information.

7. A content reception device for receiving a content, broadcasted using a broadcast wave, the content reception device comprising:

acquisition means for acquiring service information, supplied from a content broadcast device, through a predetermined network, the service information including at least a broadcast schedule of metadata and location information that indicates where the metadata is located in the broadcast wave;

reception means for receiving the metadata, broadcasted using the broadcast wave, on the basis of the service information acquired, the metadata including at least a broadcast schedule of the content and location information that indicates where the content is located in the broadcast wave, and receiving the content, broadcasted using the broadcast wave, in accordance with a download reservation generated on the basis of the metadata received;

accumulation means for accumulating the content received; and reproduction means for reproducing the content accumulated, wherein the reception means does not acquire the broadcasted metadata when a service code of the broadcasted metadata does not match a service code provided within the acquired service information.

8. The content reception device according to claim 7, wherein the acquisition means notifies the content broadcast device of registration information input by a user who has completed usage registration for a content download service, and acquires the service information, supplied from the content broadcast device in accordance with the registration information, through a predetermined network.

9. The content reception device according to any one of claims 7 and 8, wherein the reception means acquires the received metadata when a service code included in the service information acquired matches a service code in the received metadata.

10. The content reception device according to any one of claims 7, wherein the reception means decodes the metadata, using a decode key included in the service information, when the received metadata is encrypted.

11. The content reception device according to claim 7, further comprising:

generation means for presenting a list of downloadable contents to a user on the basis of the metadata acquired and generating the download reservation in response to a selection operation performed by the user.

12. The content reception device according to claim 11, wherein the generation means generates the download reservation on the basis of the acquired metadata when a broadcasted content corresponds to an automatic download type.

13. A content reception method performed in a content reception device for receiving a content, broadcasted using a broadcast wave, the content reception method comprising the steps of:

acquiring service information, supplied from a content broadcast device, through a predetermined network, the service information including at least a broadcast schedule of metadata and location information that indicates where the metadata is located in the broadcast wave;

receiving the metadata, broadcasted using the broadcast wave, on the basis of the service information acquired, the metadata including at least a broadcast schedule of the content and location information that indicates where the content is located in the broadcast wave;

receiving the content, broadcasted using the broadcast wave, in accordance with a download reservation generated on the basis of the metadata received;

accumulating the content received; and reproducing the content accumulated, wherein the broadcasted metadata is not acquired when a service code of the broadcasted metadata does not match a service code provided within the acquired service information.

14. A non-transitory computer readable program storage medium storing a control program, which when executed by a computer, performs a processing operation, the processing operation comprising the steps of:

acquiring service information, supplied from a content broadcast device, through a predetermined network, the service information including at least a broadcast schedule of metadata and location information that indicates where the metadata is located in the broadcast wave;

receiving the content, broadcasted using the broadcast wave, in accordance with a download reservation generated on the basis of the metadata received;

accumulating the content received; and reproducing the content accumulated, wherein the broadcasted metadata is not acquired when a service code of the broadcasted metadata does not match a service code provided within the acquired service information.

15. A content broadcast system comprising:

a content broadcast device configured to broadcast a content, using a broadcast wave; and a content reception device configured to receive the content broadcasted, wherein the content broadcast device includes supply means for supplying service information to the content reception device through a predetermined network in response to a request from the content reception device, the service information including at least a broadcast schedule of metadata and location information that indicates where the metadata is located in the broadcast wave, and broadcast means for broadcasting, using the broadcast wave, the metadata, which includes at least a broadcast schedule of the content and location information that indicates where the content is located in the broadcast wave, in accordance with the broadcast schedule of the metadata, included in the service information, and broadcasting, using the broadcast wave, the content in accordance with the broadcast schedule of the content, included in the metadata; and wherein the content reception device includes acquisition means for acquiring the service information, supplied from the content broadcast device, through the predetermined network, reception means for receiving the metadata, broadcasted using the broadcast wave, on the basis of the service information acquired and receiving the content, broadcasted using the broadcast wave, in accordance with a download reservation generated on the basis of the metadata received, accumulation means for accumulating the content received, and reproduction means for reproducing the content accumulated, wherein the reception means of the content reception device does not acquire the metadata broadcasted by the broadcast means of the content broadcast device, when a service code of the broadcasted metadata does not match a service code provided within the service information supplied from the supply means of the content broadcast device to the acquisition means of the content reception device.

16. A content providing device for providing a content, the content providing device comprising:

a supply section configured to supply service information to a content reception device through a predetermined network in response to a request from the content reception device, the service information including at least a providing schedule of metadata and location information that indicates where the metadata is located in streaming data; and a providing section configured to provide, in a manner different from the predetermined network, the metadata, which includes at least a providing schedule of the content and location information that indicates where the content is located in streaming data, in accordance with the providing schedule of the metadata, included in the service information, and provide the content in accordance with the providing schedule of the content, included in the metadata, wherein the content reception device does not acquire the provided metadata when the content reception device determines that a service code of the provided metadata does not match a service code provided within the supplied service information.

17. A content reception device for receiving a provided content, the content reception device comprising:

an acquisition section configured to acquire service information, supplied from a content providing device, through a predetermined network, the service information including at least a providing schedule of metadata and location information that indicates where the metadata is located in streaming data;

a reception section configured to receive the metadata, provided on the basis of the service information acquired, the metadata including at least a providing schedule of the content and location information that indicates where the content is located in the streaming data, and receive the provided content, in accordance with a download reservation generated on the basis of the metadata received;

an accumulation section configured to accumulate the content received; and a reproduction section configured to reproduce the content accumulated, wherein the reception section does not acquire the provided metadata when a service code of the provided metadata does not match a service code provided within the acquired service information.

* * * * *